(12) United States Patent
Abdullah et al.

(10) Patent No.: US 8,580,029 B2
(45) Date of Patent: *Nov. 12, 2013

(54) REDUCTION OF CARBON DIOXIDE IN THE MANUFACTURING OF COMPOSITE CONSTRUCTION MATERIALS

(75) Inventors: Mohd Mustafa Albakri Abdullah, Perlis (MY); Mohammed A Binhussain, Riyadh (SA); Kamarudin Hussin, Perlis (MY); Mohd Ruzaidi Ghazali, Perlis (MY); Norazian Mohammed Noor, Perlis (MY); Mohammad Tamizi Selimin, Riyadh (SA)

(73) Assignee: King Abdulaziz City Science and Technology, Riyadh (SA)

( * ) Notice: Subject to any disclaimer, the term of this patent is extended or adjusted under 35 U.S.C. 154(b) by 76 days.

This patent is subject to a terminal disclaimer.

(21) Appl. No.: 13/118,624

(22) Filed: May 31, 2011

(65) Prior Publication Data

US 2012/0304894 A1    Dec. 6, 2012

(51) Int. Cl.
*C04B 12/04*     (2006.01)

(52) U.S. Cl.
USPC ................. 106/600; 106/705; 106/718

(58) Field of Classification Search
USPC .......................... 106/600, 705, 718
See application file for complete search history.

(56) References Cited

U.S. PATENT DOCUMENTS

| 4,642,137 A | * | 2/1987 | Heitzmann et al. ........... 106/607 |
| 2011/0290153 A1 | * | 12/2011 | Abdullah et al. ............. 106/694 |
| 2012/0037043 A1 | * | 2/2012 | Zubrod ....................... 106/606 |

* cited by examiner

*Primary Examiner* — Paul Marcantoni
(74) *Attorney, Agent, or Firm* — Raj Abhyanker, P.C.

(57) ABSTRACT

Disclosed are a system, a method and/or composition of reduction of carbon dioxide in the manufacturing of cement and concrete. In one embodiment, a method of producing a concrete, includes preparing a dried powder mixture of an alkali hydroxide, a sodium silicate, clay and a pozzolanic material. The dried powder with water may be reacted to form a cement paste. In addition, the cement paste may be mixed with at one of sand, an aggregate, a plasticizer and a nano additive to form the concrete.

19 Claims, 7 Drawing Sheets

FIGURE 1

| MATERIAL 202 | FLY ASH & KAOLIN 204 | SODIUM SILICATE 206 | NaOH 208 | FINE AGGREGATE 210 | COARSE AGGREGATE 212 | WATER 214 |
|---|---|---|---|---|---|---|
| WEIGHT (KG) 216 | 350 - 400 | 100 - 150 | 30 - 60 | 500 - 600 | 1200 - 1400 | 60 - 400 |

← AMOUNT OF MATERIALS FOR PRODUCING A CONCRETE BLOCK 200

FIGURE 2

| PROPERTIES 302 | CONCRETE 304 | LIGHT WEIGHT CONCRETE 306 |
|---|---|---|
| COMPRESSIVE STRENGTH 308 | 15 - 80MPa | 10 - 40MPa |
| DENSITY 310 | 1800 - 2200KG/M$^3$ | 1000 - 1600KG/M$^3$ |
| WATER ABSORPTION 312 | 0.01 - 2.00% | 0.1 - 5.0% |
| FIRE RESISTANCE 314 | STABLE AT TEMPERATURE UP TO 1000°C | STABLE AT TEMPERATURE UP TO 1000°C |
| POROSITY 316 | 0.1 - 0.4% | 0.1 - 30% |
| SETTING TIME 318 | 1 - 2 HOURS | 2 - 4 HOURS |
| STRENGTH GAIN 320 | 1 - 3 DAYS (FULL STRENGTH) | 1 - 3 DAYS (FULL STRENGTH) |

MECHANICAL AND PHYSICAL PROPERTIES OF THE CONCRETES 300

REDUCTION OF CARBON DIOXIDE IN THE MANUFACTURING OF COMPOSITE CONSTRUCTION MATERIALS

FIELD OF TECHNOLOGY

This disclosure relates generally to the technical fields of concrete and cement production and, in one example embodiment, to a method of producing an environmentally friendly concrete that utilizes a mixture of alkali hydroxide, sodium silicate, a pozzolanic material and clay as the cementious materials of the concrete.

BACKGROUND

Concrete may be a composite construction material that may be used in building. Concrete may be comprised of a mixture of cement paste, sand and aggregates. The cement paste may comprise cement and water. The cement may be Ordinary Portland Cement, a type of cement made out of raw material such as limestone. The manufacturing of Ordinary Portland Cement produces more than 13 billion tons of carbon dioxide every year. This carbon dioxide emission is equivalent to 7% of the total global emission of carbon dioxide to the atmosphere. This carbon dioxide emission may lead to environmental problems such as global warming and the greenhouse effect.

SUMMARY

Disclosed are a system, a method and/or a composition of reduction of carbon dioxide in the manufacturing of cement and concrete. In one aspect, a method of producing a concrete includes preparing a dried powder mixture of an alkali hydroxide, a sodium silicate, a clay and a pozzolanic material and reacting the dried powder with water to form a cement paste. The method further includes mixing the cement paste with one of a sand, an aggregate, a plasticizer and a nano additive to form a concrete.

In addition, the method may include reducing an emission of carbon dioxide by approximately 90% through reacting the dried powder with water to form the cement. The method may also include strengthening the concrete through reacting the dried powder with water to form the cement paste. The dried powder may be produced by a drying and grinding process at a temperature of 40° to 100° Celsius and grinding the dried powder after it has dried. The dried powder may also be produced by spray drying at a temperature of 40° to 100° Celsius. The spray drying process may include spraying a liquid cement through a nozzle into a high temperature vapor steam, vaporizing the liquid cement to form a plurality of droplets and drying the plurality of droplets to form the dried powder kaolin as wet method or the dried powder also can produced by mixing together all the raw material and after that drying process with temperature between 400-1000° C. drying process will form dried stone. Dried stone will grinding and/or miling with control speed to form dried powder as dry method.

Furthermore, the method may include using a pozzolanic material which is one of a natural pozzolanic mineral, a lava mineral, a basalt, a fly ash, a blast furnace slag, a bottom ash, a recycled ash and a ground granulated blast furnace slag. The method may include using a ratio of water to the dried powder mixture ranging from 0.35 to 0.65. The dried powder may be mixed with one of a superplasticizer and a polymeric additive to enable the production of a self-consolidating concrete and to enhance the performance of the concrete. In addition, the method may include an alkali hydroxide that is one of sodium hydroxide and potassium hydroxide. The method may further include using a clay that may be a In another aspect, a cement composition may include a dried and pulverized mixture of a pozzolanic material, a clay and a sodium silicate dissolved in a solution of alkali hydroxide wherein the mixture is dried at a temperature of 40° to 100° Celsius and then ground into a fine powder. In one embodiment, the alkali hydroxide may be at a concentration of 6 to 16 moles/liter (M) when the pozzolanic material may be a fly ash. The cement composition may further include a mixture of sodium silicate and alkali hydroxide in a ratio that ranges from 0.5 to 3.5. The ratio of the pozzolanic material to the alkaline activator or solid to liquid may range from 1.0 to 3.5.

In addition, the cement composition may be used to produce an environmentally friendly concrete that emits a low amount of carbon dioxide. The cement composition may be used to produce a concrete with high compressive and flexibility strength and a concrete that may be resistant to sulfuric acid and fire.

In yet another aspect, a method may include preparing a mixture of a sodium silicate, an alkali hydroxide, a pozzolanic material, and a clay, spraying the mixture through a nozzle into a high temperature vapor steam, vaporizing the liquid cement to form a plurality of droplets, drying the plurality of droplets to form a dried powder, and reacting the dried powder with water to form a cement. The method may also include mixing the cement with one of an aggregate and a plasticizer to form the concrete.

BRIEF DESCRIPTION OF THE DRAWINGS

Example embodiments are illustrated by way of example and not limitation in the figures of the accompanying drawings, in which like references indicate similar elements and in which.

Other features of the present embodiments will be apparent from the accompanying Drawings and from the Detailed Description that follows.

DETAILED DESCRIPTION

Disclosed are a system, a method and/or a composition of reduction of carbon dioxide in the manufacturing of cement and concrete. It will be appreciated that the various embodiments discussed herein need not necessary belong to the same group of exemplary embodiments; and may be grouped into various other embodiments not explicitly disclosed herein. In the following description, for the purpose of explanation, numerous specific details are set forth in order to provide a thorough understanding of various embodiments.

Figure 1:
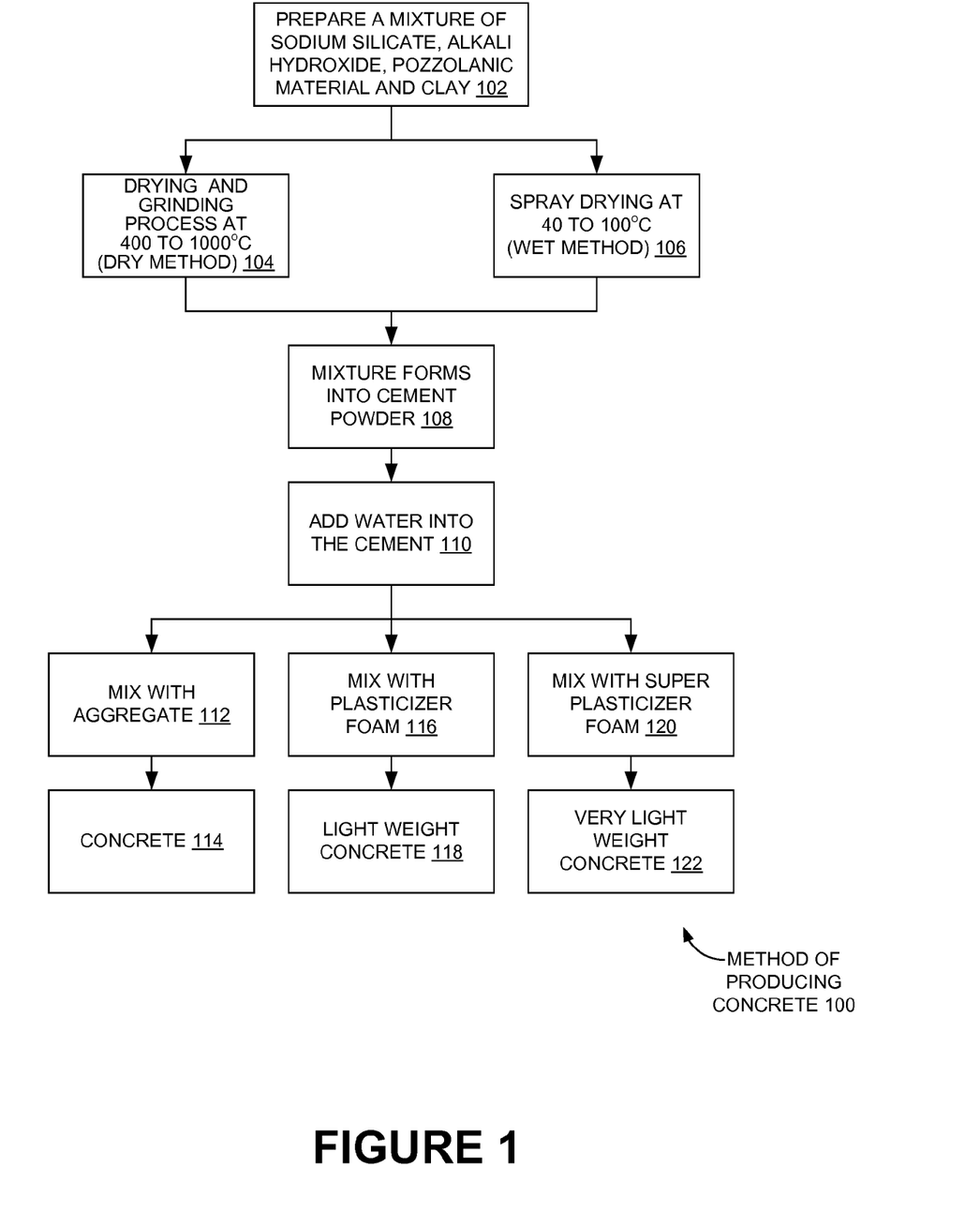
FIG. 1 is a flow diagram illustrating a method of producing geopolymer cement and concrete, according to one or more embodiments.

FIG. 1 is a flow diagram illustrating a method of producing geopolymer cement and concrete, according to one or more embodiments. In one or more embodiments, a mixture of sodium silicate, alkali hydroxide, pozzolanic material and clay may be prepared, such as in operation 102. In one or more embodiments, a sodium silicate may be sodium metasilicate, $Na_2SiO_3$. Sodium metasilicate may be in powder form and may easily be dissolved in water. Sodium metasilicate be available in liquid or solid form. In one or more embodiments, the sodium metasilicate may reduce the porosity 316 of the concrete that is eventually formed from the mixture.

In one or more embodiments, the pozzolanic material may be a material, that when combined with an alkali hydroxide, exhibits cementitious properties. Pozzolanic materials may be commonly used as an addition to cement concrete mixtures to increase the long-term strength of the concrete. In one or more embodiments, the pozzolanic material may include a siliceous and/or aluminous chemical substance, and may be highly vitreous. For example, the pozzolanic material may include a natural pozzolanic mineral, a lava mineral, a basalt, a fly ash, a blast furnace slag, a bottom ash, a recycled ash and a ground granulated blast furnace slag, etc. In one or more embodiments, the clay may be a kaolin. Kaolin may be preferred because of its ability to reinforce the strength 320 of the concrete.

In one or more embodiments, alkali hydroxide may be composed of an alkali metal cation and the hydroxide anion. For example, the alkali hydroxide may be Lithium hydroxide (LiOH), Sodium hydroxide (NaOH), Potassium hydroxide (KOH), Rubidium hydroxide (RbOH) or Caesium hydroxide (CsOH). In one or more embodiments, the alkali hydroxide may be used in powder form. In one or more embodiments, the alkali hydroxide may also be used in liquid form, where it may be added after dry mixing of the other constituents and before the water is added. In one embodiment, the alkali hydroxide may be at a concentration of 6 to 16 moles/liter (M) when the pozzolanic material may be a fly ash. In another embodiment, the alkali hydroxide may be at a concentration of 1.0 to 1.8 moles/liter (M) when the pozzolanic material may be a clay. In one or more embodiments, the ratio of the pozzolznic material to the alkaline activator (solid to liquid) may range from 1.0 to 3.5.

In one or more embodiments, the sodium silicate may be mixed with the alkali hydroxide in a ratio ranging from 0.5 to 3.5. The sodium silicate may be available in an aqueous solution and/or in solid form. The sodium silicate may increase the force character and durability for cement as fast-drying material. In one or more embodiments, the mixture of pozzolanic material, clay and a sodium silicate may be dissolved in a solution of alkali hydroxide.

In one or more embodiments, such as in operation 104, the mixture may be dried using a drying and grinding process. The drying and grinding process may occur at a temperature of 40° to 100° Celsius (104° to 212° Fahrenheit) for wet method and 40° to 100° Celsius for dry method. The dried mixture may be ground by a grinder to form a fine dried powder, such as in operation 108. Because the mixture may be produced out of waste elements such as fly ash and kaolin, the mixture may only require heating to a temperature of 40° to 100° Celsius (104° to 212° Fahrenheit). In contrast, cement made out of raw materials, such as limestone, may require heating to over 1400° Celsius (104° to 212° Fahrenheit). Doing the drying process at a much lower temperature may consume significantly much less energy, and in turn may reduce carbon dioxide emission by as much as 90%. Reducing the carbon dioxide produced by the drying process may benefit the environment, since carbon dioxide emissions may lead to climate change and the greenhouse effect.

In one or more embodiments, such as in operation 106, the mixture may be dried by using a spray drying process. A spray drying process may be a method to convert a solution, suspension or emulsion into a solid powder in one single process step. A spray drying process may also be used to obtain crystalline product. The dried powder may be produced by spray drying at temperature of 40° to 100° Celsius (104° to 212° Fahrenheit). The spray drying process may comprise spraying the mixture through a nozzle into a high temperature vapor steam. The liquid cement may be vaporized to form a plurality of droplets. The plurality of droplets may be dried to form a dried powder, such as in operation 108.

The concrete that is produced by the spray drying process may have a lighter weight than a concrete that is produced by a drying and grinding process. The weight of a concrete cube with a size of 100×100×100 mm may be 1.0 to 1.6 kg if the powder was produced by the spray drying process and 1.8 to 2.2 kg if the powder was produced by the drying and grinding process.

In operation 110, a required amount of water may be added into the dried powder in order form a cement paste. In one or more embodiments, the water may be mixed with the dried powder in a ratio ranging from 0.1 to 1.0. The cement paste may serve as a binder, a substance that may set and harden independently and bind other components together. Cement may be mixed with aggregate materials to produce a concrete.

The cement paste may be mixed with one of sand, aggregate, plasticizer and/or nano additive to form the concrete. In operation 112, the cement paste may be mixed with an aggregate. The aggregate may be a coarse particulate material, such as sand, gravel, crushed stone, slag, recycled concrete and geosynthetic aggregates. The aggregate may reinforce the structure of the composite material and strengthen the concrete. The mixture of aggregate and the cement paste may form a concrete 114. In operation 116, the cement paste may instead be mixed with a plasticizer to form a light-weight concrete 118. A plasticizer may be an additive that increases the fluidity or plasticity of the concrete. The plasticizer may increase the workability of the mix, or decrease the amount of water required to achieve the desired workability. The plasticizer may be manufactured from lignosulfanates. The plasticizer may increase the strength of the concrete by decreasing the water to cement ratio. A light weight concrete 118 may be formed by mixing the cement paste with the plasticizer.

In operation 120, a superplasticizer may also be added to make a very light weight concrete 122 with self-consolidating properties. A superplasticizer may be preferred because it produces a concrete with self-consolidating properties that enhance the performance of the concrete. The superplasticizers may be linear polymers containing sulfonic acid groups attached to the polymer backbone. The superplasticizers may also be known as high range water reducers. Superplasticizers may advantageously improve paste fluidity with reduction in the amount of water consumed during the preparation of the cement paste. Superplasticizers may also increase the workability of the concrete. The mixture with a superplasticizer added may be cured at room temperature or by heat curing at a temperature of 40° to 100° Celsius (104° to 212° Fahrenheit).

Figure 2:
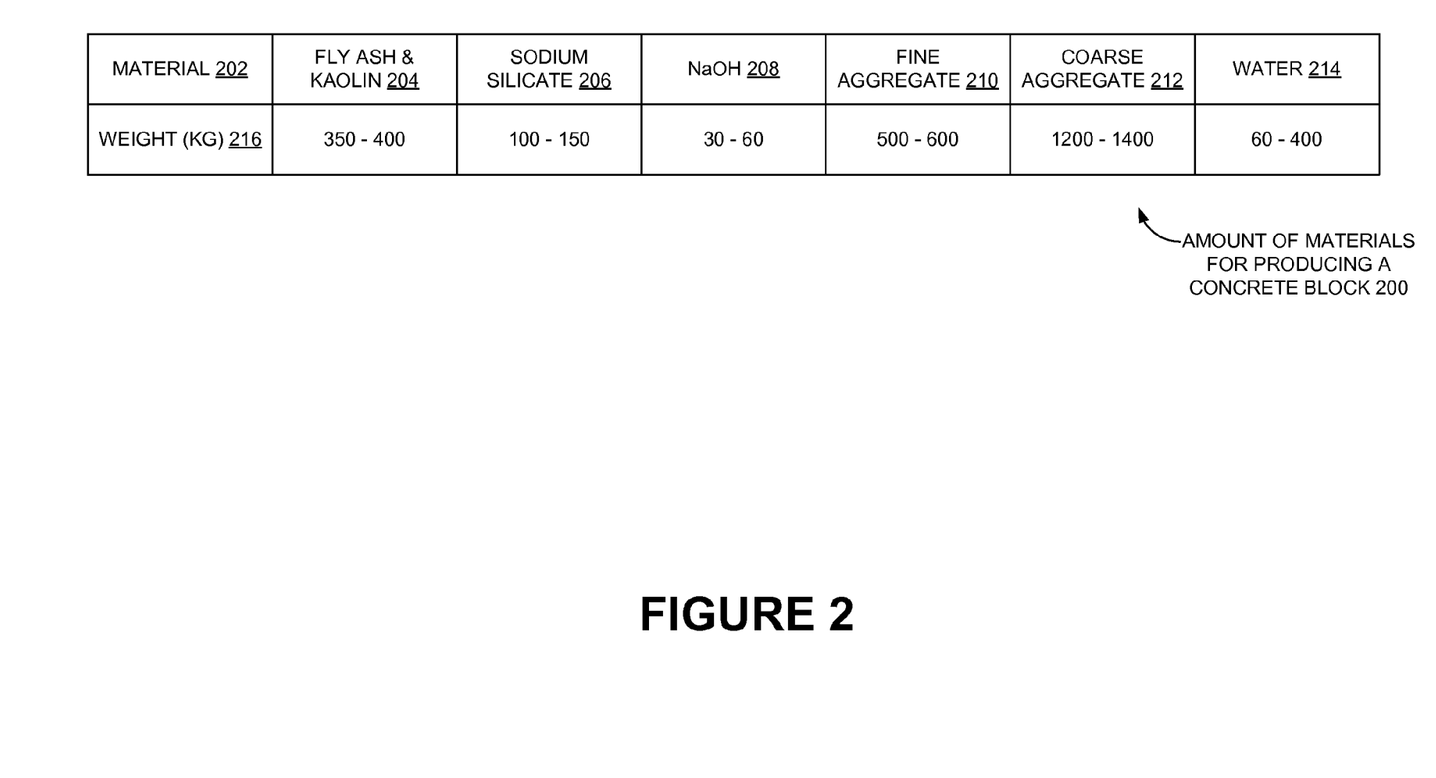
FIG. 2 is a table illustrating the amount of materials for producing a concrete block, according to one or more embodiments.

FIG. 2 is a table illustrating the amount of materials for producing a concrete block 200, in one example embodiment. In one or more embodiments, the material(s) 202 may be shown with respect to their weight 216. Weight may be measured in Kilograms (KG). In one or more embodiments, the fly ash and kaolin 204 may be added in the amount of 350 to 400 KG. In one or more embodiments, the sodium silicate 206 may be present in the concrete block 200 in the amount of 100 to 105 KG. In one or more embodiments, sodium hydroxide (NaOH) 208 may be present in the concrete block 200 in an amount of 30 to 60 KG. In one or more embodiments the fine aggregate 210 may be present in the range of 500 to 600 KG in the concrete block 200. In one or more embodiments, coarse aggregate 212 may be present in the range of 1200 to 1400 KG in the concrete block 200. In one or more embodiments, water may be present in the range of 60 to 400 KG.

Figure 3:
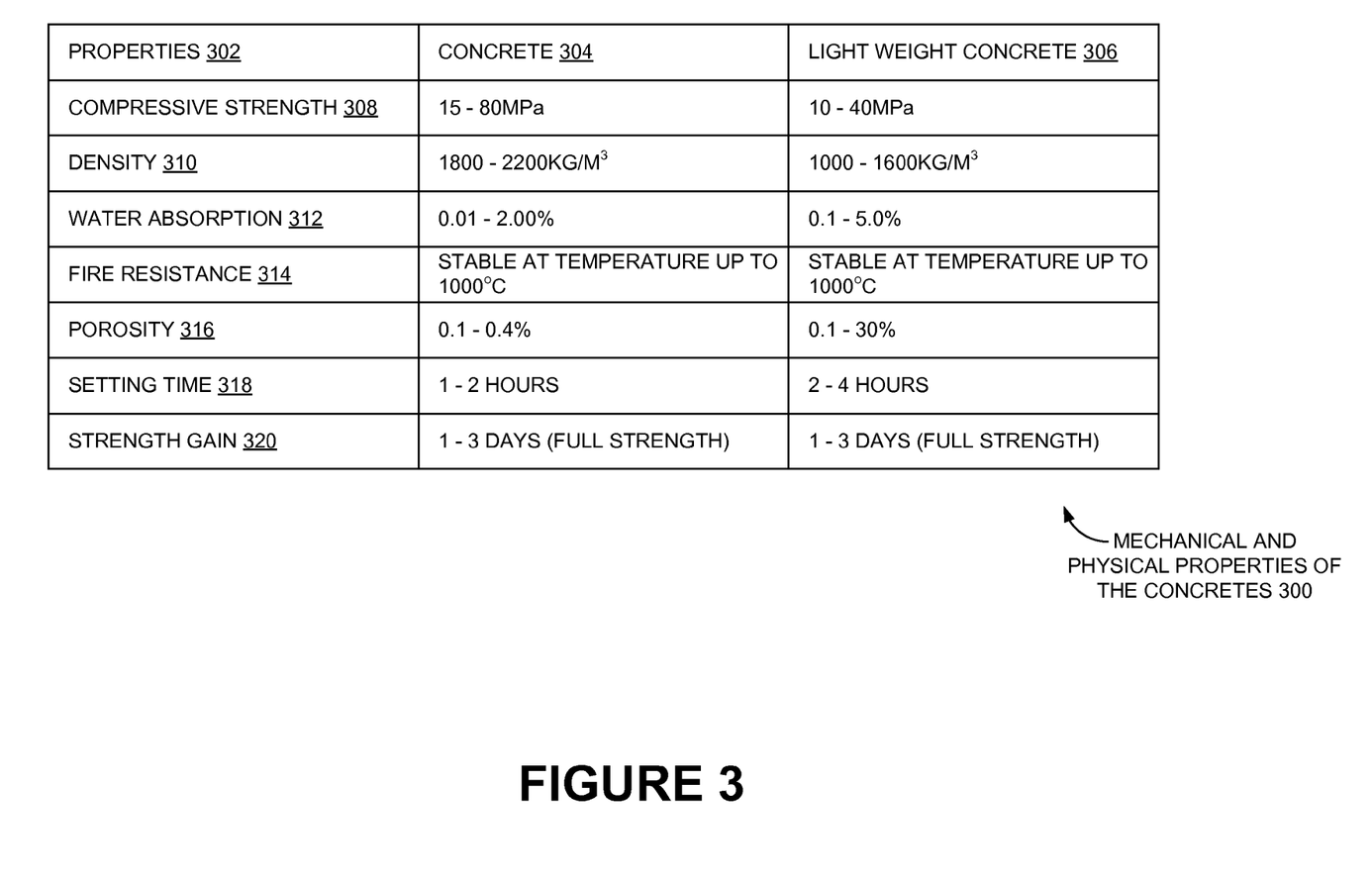
FIG. 3 is a table illustrating the mechanical and physical properties of the concrete, according to one or more embodiments.

FIG. 3 is a table illustrating the mechanical and physical properties of the concretes, in one or more embodiments. In one example embodiment, the properties 302 may refer to the properties of a concrete 304 and a light weight concrete 306. In one or more embodiments, the properties 302 may include compressive strength 308, density 310, water absorption 312, fire resistance 314, porosity 316, setting time 318 and/or strength gain 320.

The compressive strength 308 may be measured by breaking a cylindrical concrete specimen in a compression-testing machine. In one or more embodiments, the compressive strength 308 of a concrete 304 may be 15 to 80 MPa. The compressive strength of a light weight concrete 306 may be 10 to 40 MPa.

The density of concrete may be a measure of its mass per unit volume. In one or more embodiments, density 310 of the concrete 304 may be 1800 to 2200 KG/M$^3$. In one or more embodiments, density of the light weight concrete 306 may be 1000 to 1600 KG/M$^3$ Water absorption 312 may be a ratio of the weight of the water absorbed by a composite material to the weight of the dry materials in the composite material. Too much water absorption can cause a composite material to lose its beneficial properties, such as strength. In one or more embodiments, the water absorption 312 of a concrete 304 may range between 0.01 to 2.00%. The water absorption 312 of a light weight concrete 306 may range between 0.1 to 5.0%.

Fire resistance 314 may be the ability of a composite material to withstand fire or protect itself from it. In one or more embodiments, a fire resistance 314 capacity of the concrete 304 is indicated by the fact that the concrete 304 may be stable at temperatures up to 1000° C. (1832° F.). The fire resistance 314 capacity of the light weight concrete 306 is indicated by the fact that the light weight concrete 306 may be stable at temperatures up to 1000° C. (1832° F.).

In one or more embodiments, porosity 316 may be a measure of the void spaces in a material. Porosity may be expressed as a percentage of the volume of voids in a total volume. Porosity may be inversely related to concrete strength. High porosity percentage may make concrete weaker and easy to break. The porosity of the concrete 304 may be 0.1 to 0.4%. The porosity of the light weight concrete 306 may be 0.1 to 30%.

In one or more embodiments, the required setting time 318 may be the time it takes the concrete to harden. In one or more embodiments, the required setting time 318 for a concrete 304 may be 1-2 hours. The concrete 304 may gain full strength in 1-3 days. The required setting time 318 for light weight concrete 306 may be between 2 to 4 hours. The light weight concrete 306 may gain full strength within 1 to 3 days.

Figure 4:
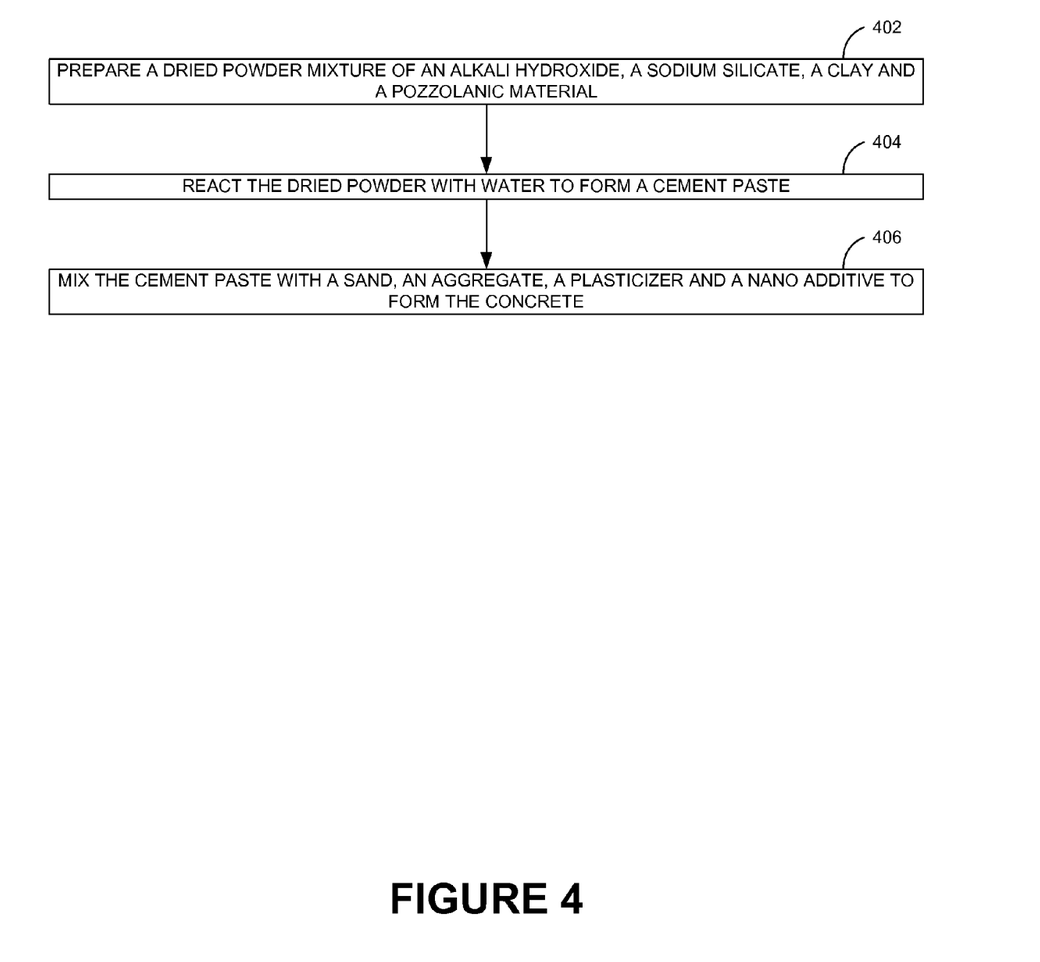
FIG. 4 is a process flow diagram illustrating a method of producing concrete, according to one or more embodiments.

FIG. 4 is a process flow diagram illustrating a method of producing concrete, according to one or more embodiments. In one or more embodiments, in operation 402, a dried powder mixture of an alkali hydroxide, a sodium silicate, clay and a pozzolanic material may be prepared. In operation 404, the dried powder may be reacted with water to form a cement paste. In operation 406 the cement paste may be mixed with a sand, an aggregate, a plasticizer and a nano additive to form the concrete.

Figure 5:
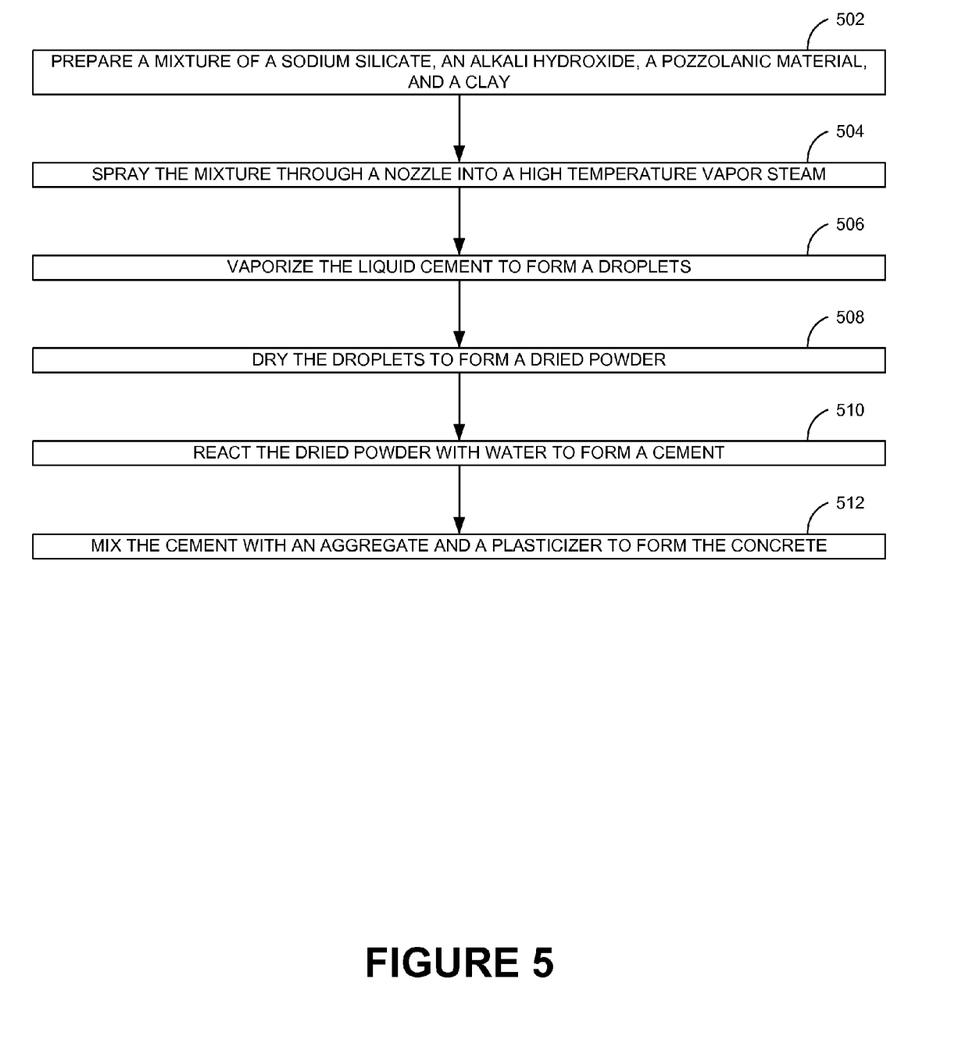
FIG. 5 is a process flow diagram illustrating another method of producing concrete, according to one or more embodiments.

FIG. 5 is a process flow diagram illustrating a method of producing concrete using a spray drying process, according to one or more embodiment. In operation 502, a mixture of sodium silicate, an alkali hydroxide, a pozzolanic material, and a clay may be prepared. In operation 504, the spray mixture may be sprayed through a nozzle into a high temperature vapor steam. In operation 506, the liquid cement may be vaporized to form droplets. In operation 508, the droplets may be dried to form a dried powder. In operation 510, the dried powder may be reacted with water to form cement. In operation 512, the cement may be mixed with an aggregate or a plasticizer to form the concrete.

Figure 6:
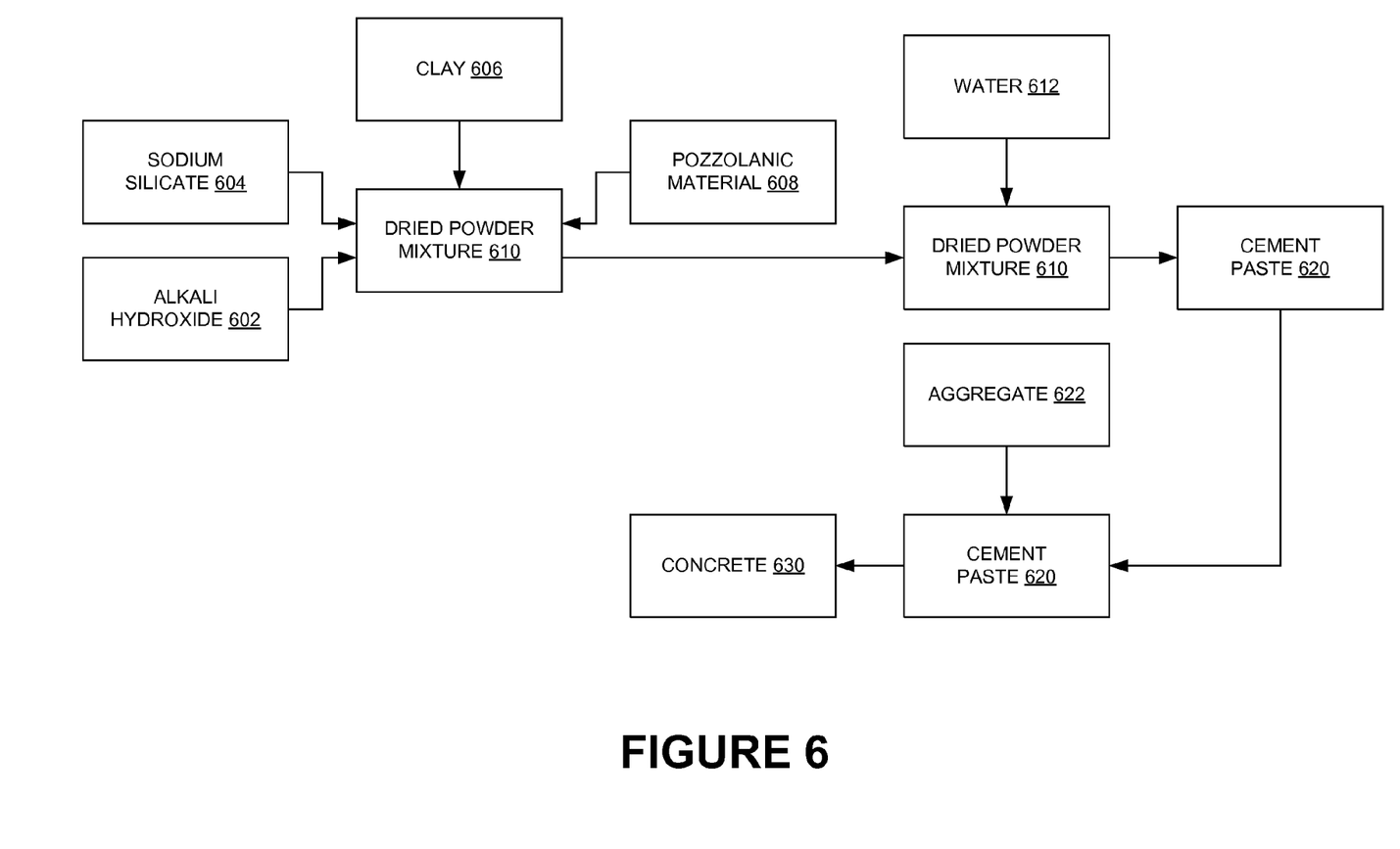
FIG. 6 is a graphical process flow diagram illustrating a method of producing a concrete, according to one or more embodiments.

FIG. 6 is a graphical process flow diagram illustrating a method of producing a concrete, according to one or more embodiments. Alkali hydroxide 602, sodium silicate 604, clay 606 and a pozzolanic material 608 may be mixed together to form a dried powder mixture 610. The alkali hydroxide 602 may be one of Lithium hydroxide (LiOH), Sodium hydroxide (NaOH), Potassium hydroxide (KOH), Rubidium hydroxide (RbOH) or Caesium hydroxide (CsOH). In one or more embodiments, a sodium silicate may be sodium metasilicate, $Na_2SiO_3$. In one or more embodiments, the clay may be a kaolin. In one or more embodiments, the pozzolanic material may include a siliceous and/or aluminous chemical substance, and may be highly vitreous. For example, the pozzolanic material may include a natural pozzolanic mineral, a lava mineral, a basalt, a fly ash, a blast furnace slag, a bottom ash, a recycled ash and a ground granulated blast furnace slag, etc.

In one embodiment, the alkali hydroxide may be at a concentration of 6 to 16 moles/liter (M) when the pozzolanic material may be a fly ash. In one or more embodiments, the ratio of the pozzolznic material to the alkaline activator or solid to liquid may range from 1.0 to 3.5

A required amount of water 612 may be added to the dried powder mixture 610 to create a cement paste 620. In one or more embodiments, the water 612 may be mixed with the dried powder mixture 610 in a ratio ranging from 0.1 to 1.0. The cement paste 620 may serve as a binder, a substance that may set and harden independently and bind other components together. The cement paste 620 may then be mixed with an aggregate 622 to create a concrete 630. The aggregate 622 may be a coarse particulate material, such as sand, gravel, crushed stone, slag, recycled concrete and geosynthetic aggregates. The aggregate 622 may reinforce the structure of the composite material and strengthen the concrete 630.

Figure 7:
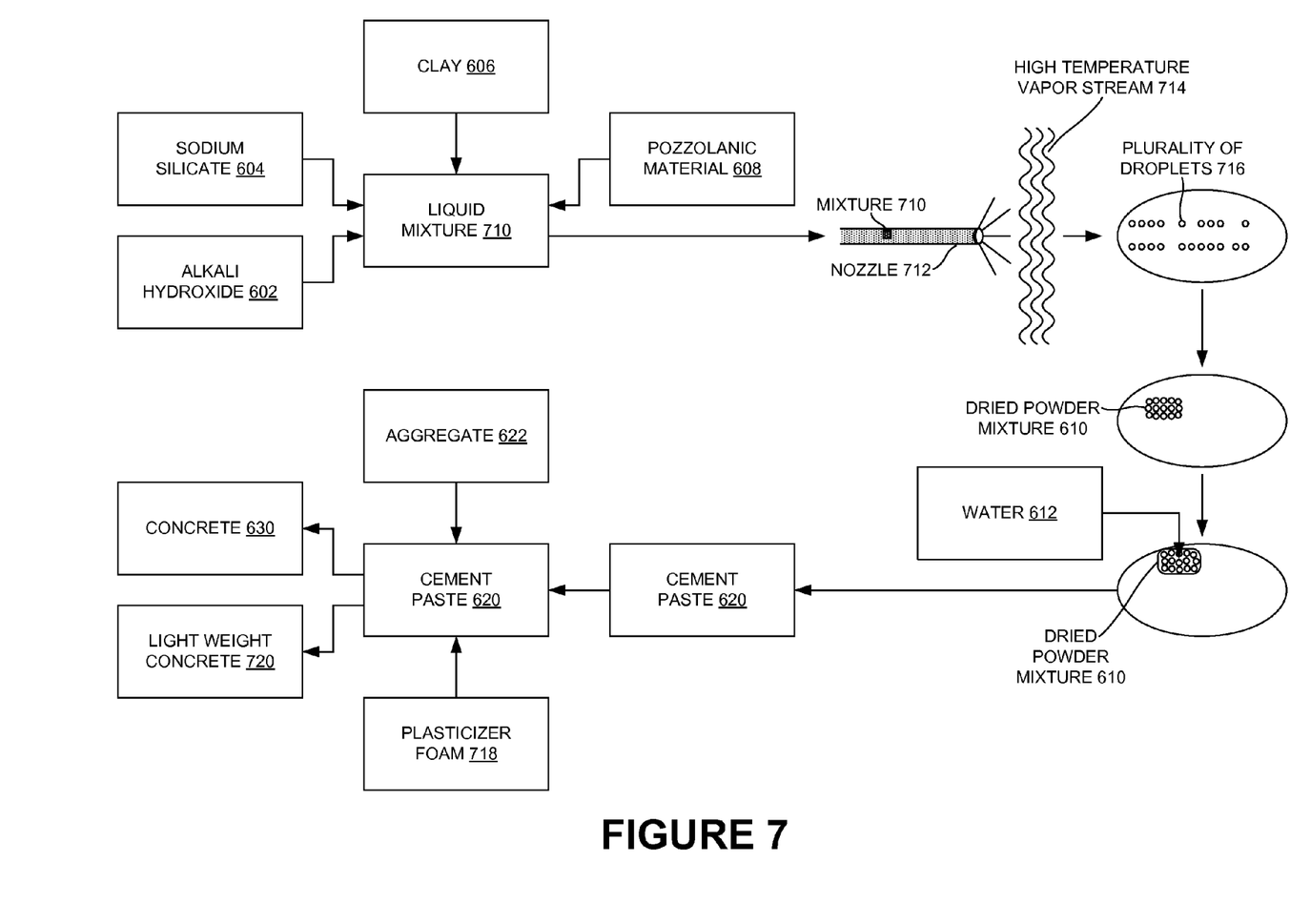
FIG. 7 is a graphical process flow diagram illustrating a method of producing a concrete using spray-drying, according to one or more embodiments.

FIG. 7 is a graphical process flow diagram illustrating a method of producing a concrete using spray-drying, according to one or more embodiments. Alkali hydroxide 602, sodium silicate 604, clay 606 and a pozzolanic material 608 may be mixed together to form a liquid mixture 710. The alkali hydroxide 602 may be one of Lithium hydroxide (LiOH), Sodium hydroxide (NaOH), Potassium hydroxide (KOH), Rubidium hydroxide (RbOH) or Caesium hydroxide (CsOH). In one or more embodiments, a sodium silicate 604 may be sodium metasilicate, $Na_2SiO_3$. In one or more embodiments, the clay 606 may be a kaolin. In one or more embodiments, the pozzolanic material 608 may include a siliceous and/or aluminous chemical substance, and may be highly vitreous. For example, the pozzolanic material 608 may include a natural pozzolanic mineral, a lava mineral, a basalt, a fly ash, a blast furnace slag, a bottom ash, a recycled ash and a ground granulated blast furnace slag, etc.

In one or more embodiments, the liquid mixture 710 may be sprayed through a nozzle 712 into a high-temperature vapor stream 714. The liquid mixture 710 may form a plurality of droplets 716. The plurality of droplets 716 may be dried to form a dried powder mixture 610. The plurality of droplets 716 may be dried at a temperature of 40° to 100° Celsius (104° to 212° Fahrenheit). The dried powder mixture 610 may be combined with a required amount of water 612 to form a cement paste 620. The cement paste 620 may serve as a binder, a substance that may set and harden independently and bind other components together. The cement paste 620 may be combined with an aggregate 622 to form a concrete 630. The aggregate 622 may be a coarse particulate material, such as sand, gravel, crushed stone, slag, recycled concrete and geosynthetic aggregates. The aggregate 622 may reinforce the structure of the composite material and strengthen the concrete.

In another embodiment, the cement paste 620 may be combined with a plasticizier 718 to form a light weight concrete 720. A plasticizer 718 may be an additive that increases the fluidity or plasticity of the concrete. The plasticizer 718 may increase the workability of the mix, or decrease the amount of water required to achieve the desired workability. The plasticizer 718 may be manufactured from lignosulfanates. The plasticizer may increase the strength of the concrete by decreasing the water to cement ratio.

Although the present embodiments have been described with reference to specific example embodiments, it will be evident that various modification and changes may be made to these embodiments without departing from the broader spirit and scope of the various embodiments. Accordingly, the specification and drawings are to be regarded in an illustrative rather than a restrictive sense.

What is claimed is:

1. A method of producing a concrete, comprising:
   preparing a mixture of an alkali hydroxide, a sodium silicate, a clay and a pozzolanic material;
   drying the mixture at a reduced temperature in comparison to the conventional method of making Portland cement clinker to form a dried powder mixture,
     wherein drying the mixture at the reduced temperature in comparison to the conventional method of making Portland cement clinker reduces an emission of carbon dioxide in comparison to the conventional method of making Portland cement clinker,
   reacting the dried powder mixture with water to form a cement paste;
   mixing the cement paste with at least one of a sand, an aggregate other than sand, a plasticizer and a nano additive to form the concrete,
     wherein the weight of the alkali hydroxide used to form the concrete ranges between 30 kilograms and 60 kilograms,
     wherein the weight of the sodium silicate used to form the concrete ranges between 100 kilograms and 150 kilograms,
     wherein the weight of the pozzolanic material and the clay used to form the concrete ranges between 350 kilograms and 400 kilograms,
     wherein the weight of the water used to form the concrete ranges between 60 kilograms and 400 kilograms,
     wherein the aggregate other than sand may be at least one of:
       a fine aggregate used to form the concrete having a weight ranging between 500 kilograms and 600 kilograms, and
       a coarse aggregate used to from the concrete having a weight ranging between 1200 kilograms and 1400 kilograms.

2. The method of claim 1, further comprising:
   strengthening the concrete through reacting the dried powder mixture with water to form the cement paste.

3. The method of claim 1, wherein the dried powder is produced by a drying and grinding process at a temperature of 40° to 100° Celsius.

4. The method of claim 3, wherein the grinding process comprises of grinding the dried powder after the dried powder mixture has a property of a dried cement.

5. The method of claim 1, wherein the dried powder mixture is produced by a spray drying process at a temperature of 40° to 100° Celsius.

6. The method of claim 5, further comprising:
   spraying a liquid cement through a nozzle into a steam;
   vaporizing the liquid cement to form a plurality of droplets; and
   drying the plurality of droplets to form the dried powder mixture.

7. The method of claim 1, wherein the pozzolanic material is at least one of a natural pozzolanic mineral, a lava mineral, a basalt, a fly ash, a blast furnace slag, a bottom ash, a recycled ash and a ground granulated blast furnace slag.

8. The method of claim 1, wherein a ratio of the water to the dried powder mixture ranges from 0.1-1.0.

9. The method of claim 1, wherein the alkali hydroxide is at least one of a sodium hydroxide and a potassium hydroxide.

10. The method of claim 1, wherein the clay is a kaolin.

11. The method of claim 1, where in the dried powder mixture is mixed with at least one of a super plasticizer or admixtures and a polymeric additive to enable the production of a self-consolidating concrete and to enhance a performance of the concrete and also self-compacting or leveling concrete.

12. A cement composition comprising:
    a dried and pulverized mixture of a pozzolanic material, a clay and a sodium silicate dissolved in a solution of an alkali hydroxide wherein the mixture is dried at a
    temperature of 40° to 100° Celsius for a wet method and 400° to 1000° Celsius for a dry method.

13. The composition of claim 12, wherein the alkali hydroxide is at a concentration of 6 to 16 moles/liter (M).

14. The composition of claim 12, wherein a ratio of the sodium silicate to the alkali hydroxide ranges from 0.5 to 3.5.

15. The composition of claim 12, wherein a ratio of the pozzolanic material to the alkali hydroxide ranges from 1.0 to 3.5.

16. The composition of claim 12, wherein the cement composition is used to produce an environmentally friendly concrete that emits a reduced amount of carbon dioxide.

17. The composition of claim 12, wherein the cement composition is used to produce a concrete with increased compressive and flexibility strength.

18. The composition of claim 12, wherein the cement composition is used to produce a concrete that is resistant to sulfuric acid and fire.

19. A method of producing a concrete, comprising:
    preparing a mixture of a sodium silicate, an alkali hydroxide, a pozzolanic material, and a clay;
    spraying the mixture through a nozzle into a steam;

vaporizing the liquid cement to form a plurality of droplets;
drying the plurality of droplets to form a dried powder; and
reducing an emission of carbon dioxide by reacting the dried powder with water to form a cement paste in comparison to the conventional method of making Portland cement clinker.

* * * * *